Jan. 9, 1923.

J. DU ROTH.
TRUCK.
FILED JAN. 7, 1922.

John Du Roth
INVENTOR

BY Victor J. Evans
ATTORNEY

Jan. 9, 1923.

J. DU ROTH.
TRUCK.
FILED JAN. 7, 1922.

John Du Roth
INVENTOR

BY Victor J. Evans
ATTORNEY

Patented Jan. 9, 1923.

1,441,973

UNITED STATES PATENT OFFICE.

JOHN DU ROTH, OF PITTSBURGH, PENNSYLVANIA.

TRUCK.

Application filed January 7, 1922. Serial No. 527,751.

*To all whom it may concern:*

Be it known that I, JOHN DU ROTH, a citizen of the United States, residing at Pittsburgh, in the county of Allegheny and State of Pennsylvania, have invented new and useful Improvements in Trucks, of which the following is a specification.

This invention relates to trucks, and more particularly to a truck specially adapted for use in connection with railway cars and for similar purposes.

One of the main objects of the invention is to provide a truck of the character stated of simple construction which possesses great strength and can be manufactured at low cost. A further object is to provide a truck of this character formed of a plurality of similar elements which may be readily assembled and secured together in proper relation. Another object is to provide a truck constructed to rotatably support four or more axles positioned at opposite sides of the truck for independent rotation thus permitting the axles at one side to rotate at different speed from those at the other side when the truck is traveling about a curve. A further object is to provide simple and efficient means for resiliently supporting the upper bolster upon which the car body is supported. Further objects will appear from the detailed description.

In the drawings:—

Figure 1:
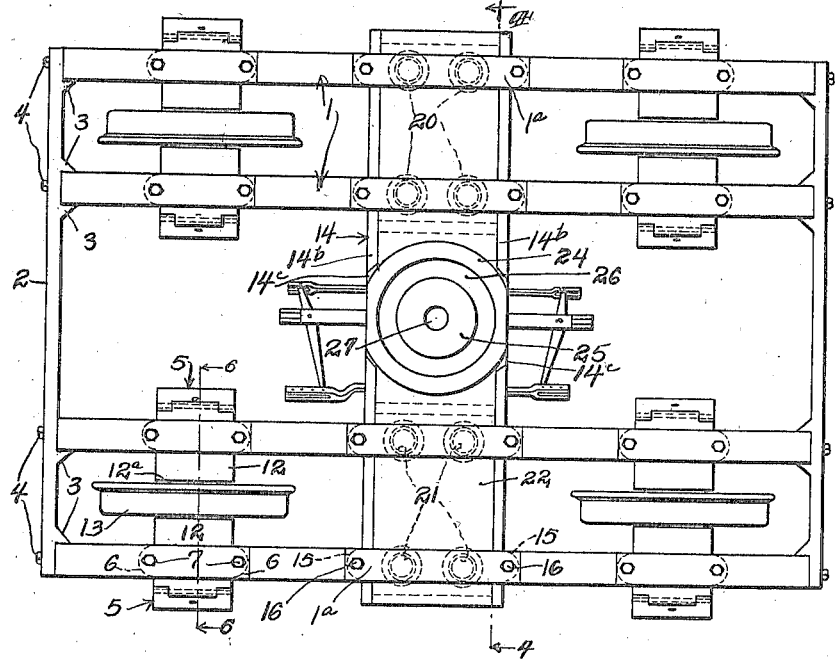
Figure 1 is a top plan view of the truck.
Figure 2:
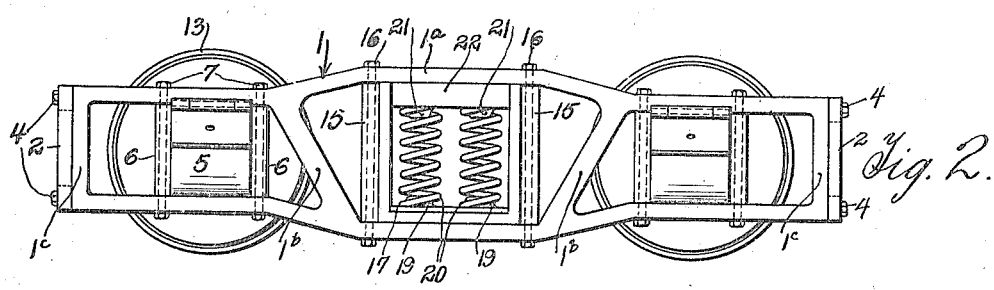
Figure 2 is a side view.
Figure 3:
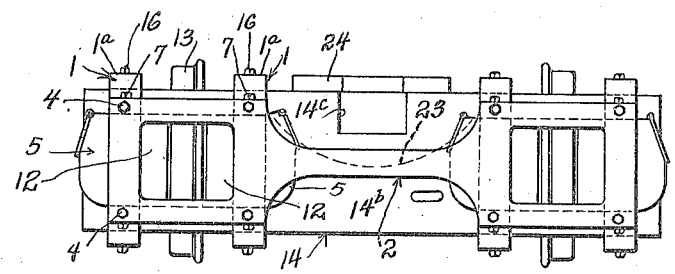
Figure 3 is an end view.
Figure 4:
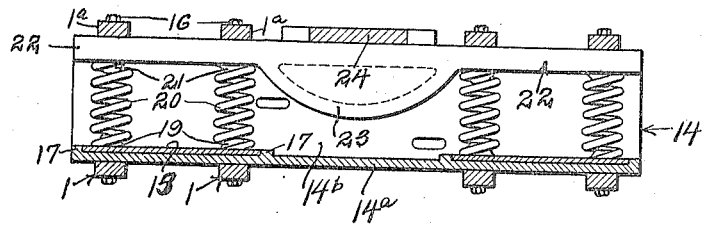
Figure 4 is a section taken substantially on line 4—4 of Fig. 1.
Figure 5:
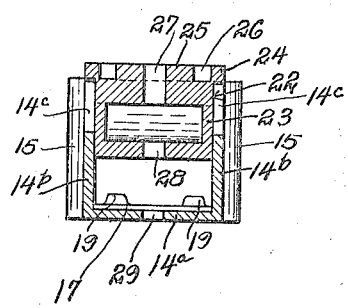
Figure 5 is a transverse vertical section through the bolsters.
Figure 6:
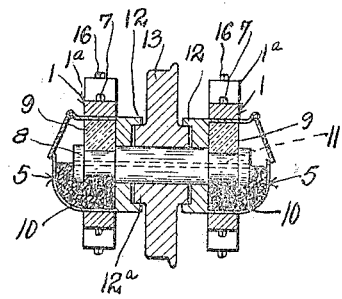
Figure 6 is a section taken substantially on line 6—6 of Fig. 1.

The truck includes four side frames 1 which are arranged in pairs at each side of the truck. These frames are of substantially elongated rectangular outline and include an enlarged central portion 1ª at each end of which is provided an inclined or truss bracing element 1ᵇ. The side frames 1 are secured in parallel spaced relation by end frames 2, these end frames being provided on their inner faces with spaced lugs 3 which fit about end bars 1ᶜ of frames 1, end frames 2 being secured to end bars 1ᶜ by screw bolts 4, or in any other suitable or preferred manner. The frames 1 and 2 when thus assembled and secured together provide a rigid structure of great strength all the parts of which are effectually secured in proper relation. The side frames and the end frames may be formed either by casting or may be pressed out of suitable material and as the side frames are identical in construction, and the end frames are identical, a material saving is effected in constructing the truck.

Journal boxes 5 are mounted in frames 1, these boxes being disposed in pairs positioned adjacent to each end of the frames and in alignment transversely of the truck. The journal box 5 is provided at each side with a rib or post 6 formed integrally with the box, this post being axially bored to receive a securing bolt 7 which passes through the top and bottom bars of frame 1. This provides simple and efficient means for securing the journal boxes in frames 1, the posts 6 and bolts 7 also serving to reinforce the frame. An axle 8 is rotatably mounted in each pair of boxes 5, suitable bearing blocks 9 being provided in each box and fitting about the upper portion of the axle. The lower portion of box 5 is filled with a suitable packing 10 of cotton waste or other suitable material adapted to absorb and retain lubricant poured into the box. The axle is provided with an axially disposed bore 11 extending from one end of the axle to the other end, this bore providing a suitable passage whereby lubricant may flow from one of the journal boxes to the other in the event that the lubricant in either box becomes exhausted. This provides simple and efficient means for preventing heating of the axle bearings. Each box 5 is further provided, at its inner end, with an inwardly projecting flange 12 which fits about hub 12ª of a car wheel 13 secured on the axle. These flanges form dust caps which serve to prevent entry of grit and other injurious foreign materials into the axle bearings. By providing four axles mounted for independent rotation in pairs at opposite sides of the truck the wheels may rotate independently of each other thus avoiding the severe strains and wear and tear to which the wheels and the truck, as well as the rails are subjected in traveling around a curve when the wheels are secured in pairs upon a common axle as is the present practice.

A lower bolster 14 is supported by frames 1 centrally thereof. This bolster is of box-like construction, being of rectangular crosssection and open at its top. Bolster 14 is provided at each side with two pairs of integral ribs or posts 15. These posts are bored to receive securing bolts 16 which are secured through the upper and lower bars of the enlarged portion 1a of each of the frames 1. The posts 15 fit snugly between the lower ends of the downwardly and inwardly inclined truss braces 1b so as to effectually secure the lower bolster 14 against movement longitudinally of the truck. The posts 15 and bolts 16, in addition to securing the lower bolster in position also serve to reinforce the frames 1. Lower bolster 14 is provided, adjacent to each end of bottom wall 14a and on the inner face thereof, with two pairs of transversely extending ribs 17. These ribs are adapted to receive between them a plate 18 which is provided adjacent to each end with a pair of studs 19. These studs receive the lower ends of coil springs 20 of any suitable or preferred type.

The upper ends of these springs fit about studs 21 provided on the inner face of upper bolster 22. This upper bolster is in the form of a heavy plate which fits between side walls 14b of lower bolster 14. The springs 21 permit vertical movement of bolster 22 in bolster 14 and provide cushion means which effectually absorb shocks incident to travel of the truck. At its central portion bolster 22 is provided with a reinforcing element 23 formed integrally with the bolster and cored out to prevent excessive weight. On its upper face bolster 22 is provided with concentric rings 24 and 25 forming an annular space 26 adapted for reception of a turn table carried by a car mounted upon the truck. The upper bolster is also provided with central openings 27 and 28 disposed in alignment with a slot 29 through bottom wall 14a of bolster 14, these openings and the slot being adapted for reception of a king pin or bolt which is passed through the turn table of the car and through the openings of the upper and lower bolsters. After the side frames 1 and end frames 2 have been secured together to form the body of the truck, and the journal boxes and axles and associated parts have been secured in position, springs 20 are placed over studs 19 of plates 18 which are placed in position between ribs 17, after which upper bolster 22 is placed in position in lower bolster 14 with studs 21 fitting into the upper ends of springs 20. After this has been done the two bolsters in their assembled relation may be slid as a unit through the enlarged elements 1a of frames 1 and secured in position by means of bolts 16 and posts 15. To permit freedom of movement of the upper bolster 22 side walls 14b of lower bolster 14 are cut away at 14c to accommodate the ring 24. Springs 20 permit vertical movement of bolster 22 and also permit tilting of the bolster, when necessary while providing very effective shock absorbing means.

The truck constructed in the manner illustrated and described is adapted to be used in connection with any suitable braking equipment of any standard or preferred type, as indicated in Figure 1 of the drawings, but the braking gear has been omitted for the sake of clearness and as forming no part of the present invention.

What I claim is:—

1. In a truck, a plurality of spaced parallel frames disposed in pairs, said frames including top and bottom bars, journal boxes provided with posts fitting between said bars, securing members passing through said posts and the bars, the posts and the securing members co-operating to hold the bars in spaced relation and to reinforce the same, said journal boxes being arranged in pairs transversely of the truck, axles rotatably mounted in the journal boxes, wheels secured on said axles, a lower bolster of boxlike construction inserted through all of said frames substantially centrally thereof, said bolster fitting snugly between the top and bottom bars of the frames, means for securing the bolster to the frames, an upper bolster mounted in the lower bolster for independent vertical movement, and cushion springs confined between said bolsters.

2. In a truck, a plurality of frames of similar construction arranged in parallel spaced relation and disposed in pairs, axles rotatably mounted in the respective pairs of frames, wheels secured on said axles, each of said frames including top and bottom bars and being provided at its central portion with downwardly and inwardly inclined brace elements spaced apart at their lower ends, a lower bolster of boxlike construction inserted through said frames and fitting snugly between the top and bottom bars thereof, the bolster also fitting snugly between the lower ends of said brace elements and being secured to the frames, said lower bolster being open at its top, an upper bolster mounted in the lower bolster for independent vertical movement, and cushion springs confined between said bolsters.

3. In combination with a truck, a lower bolster of boxlike construction, plates mounted in said bolster and held against movement therein, said plates being provided on their upper faces with a plurality of studs, an upper bolster mounted in said lower bolster for independent vertical movement and provided on its underface with a plurality of studs, and a plurality of coil springs confined between said plates and the upper bolster and having their ends fitting about said studs.

4. In a truck, a lower bolster of boxlike construction open at its top and provided at each side of its center with spaced parallel ribs on the inner face of the bottom of said bolster, plates positioned between said ribs and provided with upwardly projecting studs, an upper bolster mounted for independent vertical movement in said lower bolster and provided on its underface with studs in alignment with the studs of the plates, and coil springs confined between said plates and the upper bolster, the ends of the springs fitting about said studs.

In testimony whereof I affix my signature.

JOHN DU ROTH.